(12) United States Patent
Wood

(10) Patent No.: US 6,541,772 B2
(45) Date of Patent: Apr. 1, 2003

(54) MICROBOLOMETER OPERATING SYSTEM

(75) Inventor: Roland Andrew Wood, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 37 days.

(21) Appl. No.: 09/748,784

(22) Filed: Dec. 26, 2000

(65) Prior Publication Data

US 2002/0109092 A1 Aug. 15, 2002

(51) Int. Cl.[7] .................. H04D 5/335; H01L 27/146
(52) U.S. Cl. .................... 250/338.1; 250/332
(58) Field of Search ................... 250/338.1, 332, 250/370.08, 338.4, 349, 445.1

(56) References Cited

U.S. PATENT DOCUMENTS

| | | | |
|---|---|---|---|
| 4,298,887 A | 11/1981 | Rode ................ 358/113 |
| 4,302,674 A | 11/1981 | Bly ................ 250/332 |
| 4,654,622 A | 3/1987 | Foss et al. ............. 338/14 |
| 4,720,738 A | 1/1988 | Simmons ................ 357/30 |
| 4,752,694 A | 6/1988 | Hegel et al. ........... 250/208.1 |
| 5,220,188 A | 6/1993 | Higashi et al. ........... 257/467 |
| 5,220,189 A | 6/1993 | Higashi et al. ........... 257/467 |
| 5,260,225 A | 11/1993 | Liu et al. ............... 438/54 |
| 5,286,976 A | 2/1994 | Cole ................ 250/349 |
| 5,293,041 A | 3/1994 | Kruse ................ 250/338.3 |
| 5,420,419 A | 5/1995 | Wood ................ 250/338.4 |
| 5,422,475 A | 6/1995 | Norton ................ 250/216 |
| 5,449,910 A | 9/1995 | Wood et al. ............ 250/338.1 |
| 5,489,776 A | 2/1996 | Lung ................ 250/332 |
| 5,534,111 A | 7/1996 | Hocker et al. ........... 216/15 |
| 5,554,849 A * | 9/1996 | Gates ................ 250/370.08 |
| 5,563,431 A * | 10/1996 | Ohmi et al. ............ 257/291 |
| 5,648,667 A * | 7/1997 | Konuma ................ 257/233 |
| 5,675,149 A | 10/1997 | Wood et al. ............ 250/332 |
| 5,688,699 A | 11/1997 | Cunningham ............ 437/3 |
| 5,729,019 A | 3/1998 | Krafthefer et al. ......... 250/353 |
| 5,789,753 A | 8/1998 | Gooch et al. |
| 5,811,808 A | 9/1998 | Cannata ................ 250/332 |
| 5,812,309 A | 9/1998 | Thoma et al. ........... 359/357 |
| RE36,136 E | 3/1999 | Higashi et al. ........... 338/18 |
| 5,903,659 A | 5/1999 | Kilgore ................ 383/103 |
| 5,939,971 A | 8/1999 | Yong ................ 338/15 |
| 5,952,659 A | 9/1999 | Nomura et al. |
| 5,985,233 A | 11/1999 | Higashi ................ 438/107 |
| 5,999,211 A | 12/1999 | Hedges et al. ........... 348/144 |
| 6,011,876 A | 1/2000 | Kishner ................ 383/284 |
| 6,023,061 A | 2/2000 | Bodkin ................ 250/332 |
| 6,031,231 A | 2/2000 | Kimata ................ 250/332 |
| RE36,615 E | 3/2000 | Wood ................ 338/18 |
| 6,036,872 A | 3/2000 | Wood et al. ........... 216/2 |
| RE36,706 E | 5/2000 | Cole ................ 250/349 |
| 6,046,485 A | 8/2000 | Cole et al. ............ 257/370.06 |
| 6,344,651 B1 * | 2/2002 | Woolaway et al. ..... 250/370.08 |

OTHER PUBLICATIONS

U.S. application Ser. No. 09/748,795, filed Dec. 26, 2000 "Lightweight Infrared Camera".

(List continued on next page.)

*Primary Examiner*—Constantine Hannaher
*Assistant Examiner*—Otilia Gabor
(74) *Attorney, Agent, or Firm*—Kris T. Fredrick

(57) ABSTRACT

A microbolometer for the detection of infrared radiation that has a substrate and an array of sensor elements fixed relative to the substrate. In one embodiment, at least some of the sensor elements are less thermally isolated from the substrate than others. The less thermally isolated sensor elements are selected when transients are expected to exist within the sensor array. In another embodiment, all of the sensor elements are deselected when transients are expected.

26 Claims, 4 Drawing Sheets

OTHER PUBLICATIONS

U.S. application Ser. No. 09/748,756, filed Dec. 26, 2000 "Lens for Infrared Camera".

Internet Article: "Image Restoration," ra.stsci.edu/documents/SUG/UG_29.html, Oct. 23, 2000, 6 sheets.

Internet Article: Image Scientist,: www.image-scientist.com/order.htm, Oct. 23, 2000, 1 sheet.

Internet Article: "Lenses," elchem.kaist.ac.kr/vt/chem.-ed/optics/lenses.htm, Oct. 23, 2000, 4 sheets.

Internet Article: "MPRL—Massively Parallel Richardson–Lucy," huey.jpl.nasa.gov/mprl, Oct. 23, 2000, 2 sheets.

Internet Article: "Computer Aided Analysis and Restoration of Images," www.ndt.net/article/v04n12/palles1.htm, Oct. 23, 2000, 4 sheets.

Trussell, H.J., et al., "Sectioned Methods for Image Restoration," *IEEE Transactions on Acoustics, Speech, and Siganl Processing*, vol. ASSP–26, No. 2, Apr. 1978, pp. 157–164.

Trussell, H.J., et al., "Image Restoration of Space– Variant Blurs by Sectioned Methods," *IEEE Transactions on Acoustics, Speech, and Signal Processing*, vol. ASSP–26, No. 6, Dec. 1978, pp. 608–609.

Richardson, William Hadley, "Bayesian–Based Iterative Method of Image Restoration," *Journal of the Optical Society of America*, vol. 62, NO. 1, Jan. 1972, pp. 55–59.

Lucy, L.B., An Iterative Technique for the Rectification of Observed Distributions, *The Astronomical Journal*, vol. 779, No. 6, Jun. 1974, pp. 745–7540

Boden, A.F. t al., "Massively Parallel Spatially Variant Maximum–likelihood Restoration of Hubble Space Telescope Imagery," *Journal of the Optical Society of America*, vol. 13, No. 7, Jul. 1996, pp. 1537–1545.

Snyder, Donald L. et al., "Image Recovery From Data Acquired with a Charge–Coupled–Device Camera," *Journal of the Optical Society of America*, vol. 10, No. 5, May 1993, pp. 1014–1023.

Internet Article: "Encyclopedia Britannica, Figure 8: Lens aberrations," www.britannica, com/bcom/eb/article/single_image/0,5716,7073+asmbly_id, 00.html, Oct. 23, 2000, 1 sheet.

J. Krist, R. Hook, "The Tiny Tim User's Guide", Version 5.0, Nov. 1999, found at http://www.stsci.edu/software/tinytim, 29 pages.

Patent Abstracts of Japan: vol. 2000, No. 07; Sep. 9, 2000; & JP2000125203A (Matsushita Electronics Industry Corp.) Apr. 28, 2000 abstract.

* cited by examiner

MICROBOLOMETER OPERATING SYSTEM

FIELD OF THE INVENTION

The present invention relates generally to infrared radiation display systems, and more particularly, to microbolometers for the detection of infrared radiation and operating systems therefor.

BACKGROUND OF THE INVENTION

Infrared radiation display systems including microbolometers have found use in a wide variety of applications. Examples of applications include preventive maintenance of machinery, predictive maintenance of electrical power transmission equipment, fire prevention, fire fighting, energy conservation, law enforcement, navigation, security, and military applications.

A typical microbolometer array includes a number of thermally isolated sensor elements or pixels arranged into rows and columns. The sensor elements are typically thin film resistors that have a relatively high temperature coefficient. When infrared radiation strikes the sensor elements, the temperature of the thin film resistors rise, and the resistance changes. By measuring the resistance change, a measure of the incident infrared radiation can be determined.

The sensor elements are typically formed on a substrate using conventional semiconductor processing techniques. Each sensor element is typically provided on a bridge or the like that is thermally isolated from the substrate. Without significant thermal isolation from the substrate, the thermal mass of the substrate can prevent the incoming infrared radiation from significantly heating the thin film resistors of the sensor elements, which in turn, can significantly reduce the sensitivity of the sensor elements.

For some microbolometer arrays, one terminal of each thin film resistor is connected to a power supply voltage such as VDD. The other terminal of each thin film resistor is connected to a corresponding row read line through a column select switch. Each of the row read lines are connected to a readout line via a corresponding row select switch. The readout line can be coupled to a second supply such as ground or virtual ground through a transimpedance amplifier. The transimpedance amplifier typically provides an output signal that is related to the amount of incoming infrared radiation that is detected.

In operation, those sensor elements that are in a selected row are read in succession from a first sensor element to a last sensor element before the sensor elements in a next row are read. To accomplish this, a first row select switch is typically activated to connect a first row read line to the readout line. Then, the column select switches are sequentially activated to sequentially connect each of the sensor elements in the selected row to the selected row read line and thus the readout line. Once all sensor elements in a selected row are read, a next row select switch is activated to connect the next row read line to the read output line. Then, the column select switches are again sequentially activated to sequentially connect each of the sensor elements in the next row to the selected row read line and thus the readout line. This is continued for each row in the microbolometer array.

When the first row of sensor elements is being read, the row read lines of the unselected rows are disconnected from the readout line. Also, the column select switches that connect the unselected row read lines to VDD through the unselected sensor elements are being sequentially activated, which can selectively connect the unselected row read lines to VDD. Accordingly, the unselected row read lines tend to be at about VDD when they are unselected. When an unselected row read line becomes selected by a corresponding row select switch, the row read line is immediately connected to ground or virtual ground through the transimpedance amplifier. Because of the limited current that can be provided by the transimpedance amplifier, and because of the capacitance and resistance of the row read lines, the transition from one row read line to another can cause a transient on the newly selected row read line. This transient can make it difficult to get an accurate reading of the resistance of the first few sensor elements in each row. Thus, for some prior art microbolometer arrays, the readings for the first few columns of sensor elements may be inaccurate.

In addition, the transient current on the newly selected row read line can cause significant heating of the first few sensor elements in each row. Because the sensor elements are typically thermally isolated from the substrate, this heating can cause damage to the thin film resistors of the sensor elements.

What would be desirable, therefore, is a microbolometer array and/or operating system that reduces the possibility that a transient will occur on the row read line while a thermally isolated sensor element is read.

SUMMARY OF THE INVENTION

The present invention provides a microbolometer array and operating system that reduces the possibility that a transient will occur on a row read line while a thermally isolated sensor element is read. In one illustrative embodiment, one or more columns of "dummy" sensor elements are placed in the microbolometer array. The "dummy" sensor elements are preferably, but not necessarily, thermally connected to the substrate, allowing them to more readily handle the transient current spikes experienced by a newly selected row read line. The one or more columns of "dummy" sensor elements are preferably configured so that they are selected when a row read line is initially selected. Thus, it is the "dummy" sensor elements that are subjected to the transients on the newly selected row read line, and not the thermally isolated sensor elements that are used for imaging.

It is contemplated that a sufficient number of columns of "dummy" sensor elements may be provided so that the transients have sufficient time to settle out before the actual thermally isolated sensor elements are read. Alternatively, a single column of dummy sensor elements may be provided, and the control of the microbolometer array may be configured so that the dummy sensor element remains selected until the transients on the newly selected row read line have settled out.

In another illustrative embodiment, dummy sensors are not required. Instead, the control of the microbolometer array is configured to deselect all sensor elements in the array until the transients on the newly selected row read line have settled out. This can be accomplished by deselecting all column select switches for a period of time after a new row read line is selected. This may help prevent damage to the thermally isolated sensor elements.

DETAILED DESCRIPTION OF THE INVENTION

The following detailed description should be read with reference to the drawings, in which like elements in different drawings are numbered in like fashion. The drawings which are not necessarily to scale, depict selected embodiments and are not intended to limit the scope of the invention. In some cases, the drawings may be highly diagrammatic in nature. Examples of constructions, materials, dimensions, and manufacturing processes are provided for various elements. Those skilled in the art will recognize that many of the examples provided have suitable alternatives which may be utilized.

Figure 1:
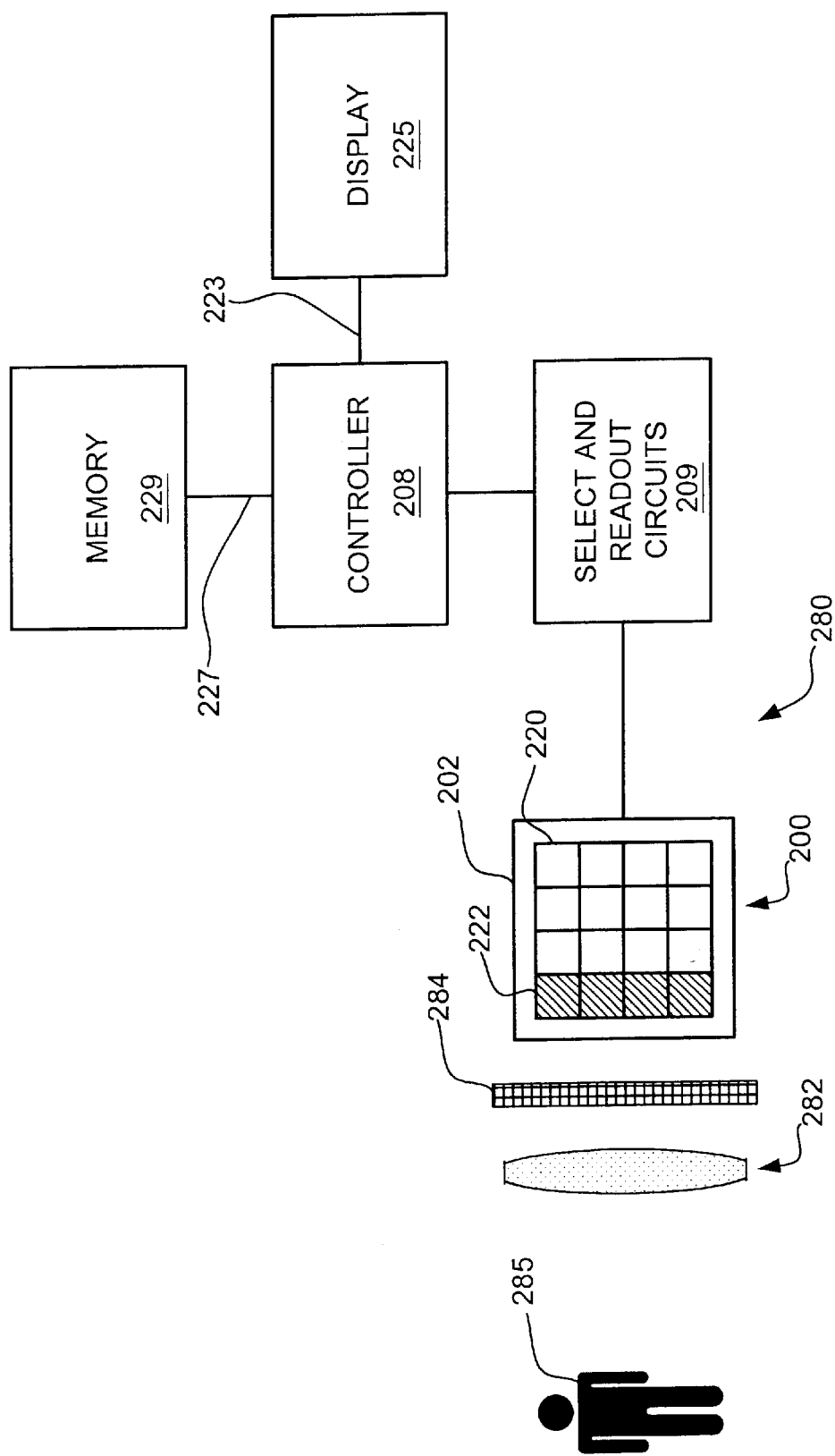
FIG. 1 is a block diagram of an infrared imaging system in accordance with an illustrative embodiment of the present invention.

FIG. 1 is a block diagram of an infrared imaging system 280 in accordance with an illustrative embodiment of the present invention. The infrared imaging system 280 includes a microbolometer array 200 and a lens system 282 that is configured so that infrared radiation emitted by a subject 285 illuminates the microbolometer array 200. In the embodiment of FIG. 1, a chopper 284 is disposed between the lens system 282 and the microbolometer array 200. The chopper 284 may be a rotating disk with openings that periodically block and let pass the infrared radiation collected by the lens system 282. The chopper may be used to, for example, periodically recalibrate the microbolometer array, as is known in the art.

The microbolometer array 200 is preferably housed in a vacuum chamber with an infrared transparent window formed in one side. The window is preferably positioned so that infrared radiation collected by the lens system 282 passes through the window onto the microbolometer array 200.

The microbolometer array 200 includes a substrate 202, an array of sensor elements 220 that are thermally isolated from the substrate 202, and in one embodiment, a number of sensor elements 222 that are less thermally isolated from the substrate. For purposes of illustration, the less thermally isolated sensor elements 222 are shown with a hatch pattern in FIG. 1.

The microbolometer array 200 is coupled to a controller 208 via a select and readout block 209. The select and readout block 209 is preferably adapted to provide sensor element select signals so that selected sensor elements or pixels are selected in succession. In one embodiment, the select and readout block 209 successively reads each of the sensor elements in a first row before successively reading the sensor elements in a next row.

In FIG. 1, the first selected sensor element in each row is a sensor element 222 that is less thermally isolated from the substrate as the remaining sensor elements in the row. As noted above, for some microbolometer arrays, the transition from one row read line to another may cause a transient on the newly selected row read line. This transient can make it difficult to get an accurate reading of the resistance of the first sensor element. The transient can also cause significant heating of the selected sensor element. However, because the first selected sensor element in each row of FIG. 1 is less thermally isolated from the substrate, the transient current spikes that might occur when a row read line is initially selected can be more readily handled.

Although only a single column of less thermally isolated sensor elements 222 are shown in FIG. 1, it is contemplated that any number of such columns can be provided. A sufficient number of columns of "dummy" sensor elements may be provided so that the transients have sufficient time to settle out before a thermally isolated sensor element 220 is read. Alternatively, a single column of dummy sensor elements may be provided, and the select and readout block 209 may cause the less thermally isolated sensor element to remain selected until the transients on the newly selected row read line have sufficiently settled out. Alternatively, the column or columns of dummy sensor elements may be thermally isolated sensor elements, with the output of the dummy sensor elements simply discarded and not used to form the image.

Controller 208 receives the successive readings of the sensor elements of the microbolometer array 200, and provides an image signal 223 to a display 225 of the infrared imaging system 280. In one embodiment, information from the dummy sensor elements 222 is not included in image signal 223. Controller 208 may also provide a data signal 227 to a memory 229 of the infrared imaging system 280. Memory 229 may include, for example, solid state memory chips (e.g., DRAM's), a hard drive, a floppy drive and disk, memory card, etc.

Figure 2:
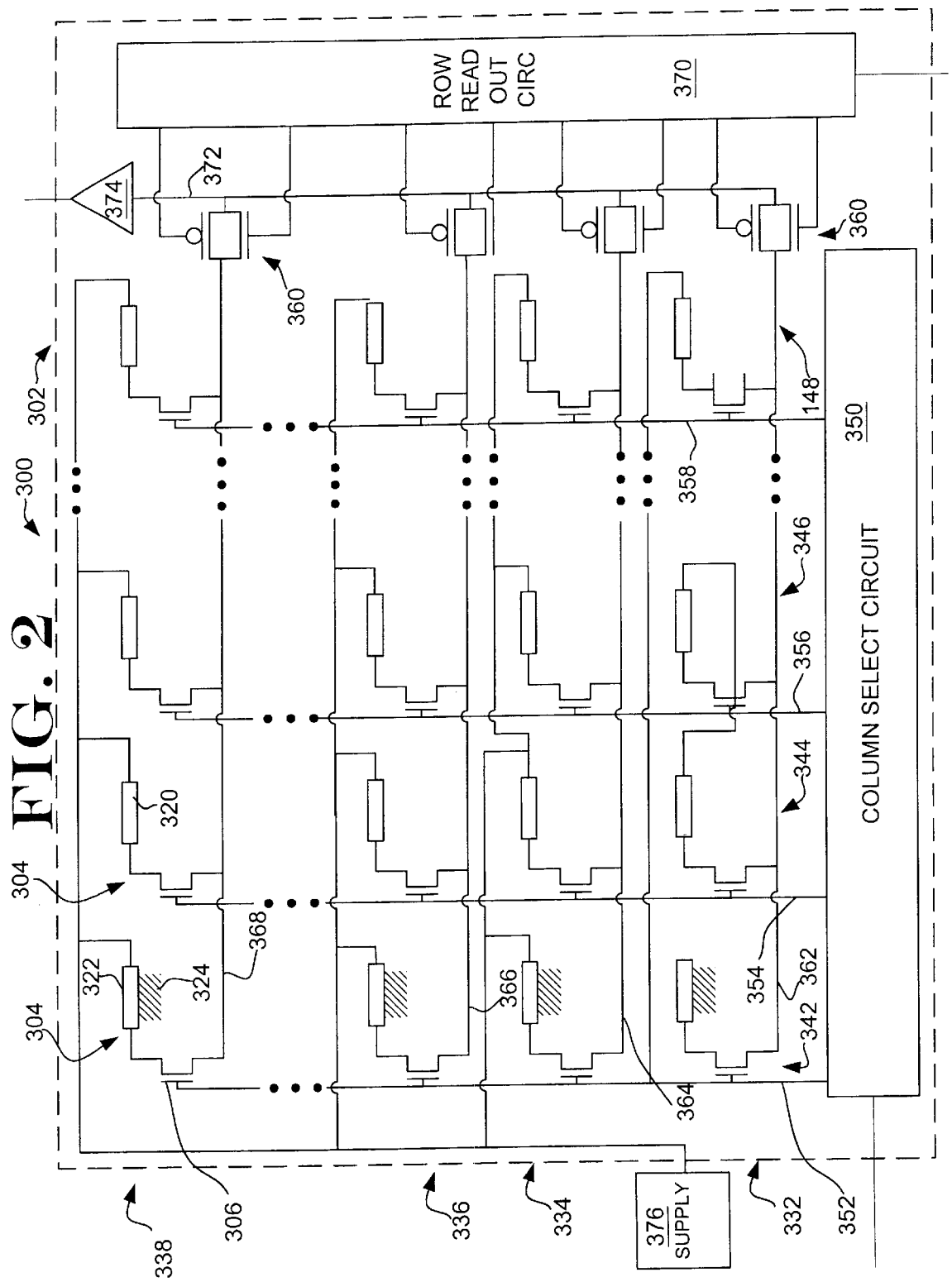
FIG. 2 is a schematic diagram of a microbolometer array in accordance with an illustrative embodiment of the present invention.

FIG. 2 is a schematic diagram of an illustrative microbolometer array 300 in accordance with an illustrative embodiment of the present invention. The microbolometer array 300 includes a substrate 302 and a plurality of pixels 304. Each pixel 304 includes a sensor element and a column select switch 306.

In the embodiment shown in FIG. 2, the electrical resistance of each sensor element is provided by a thin film resistor. It is to be appreciated that each sensor element may include various thin films without deviating from the spirit and scope of the present invention. Examples of thin films suitable in some applications include metallic thin films and semiconductor thin films.

In one illustrative embodiment, at least one of the sensor elements of the microbolometer array 300 is less thermally isolated from the substrate 302 than another one of the sensor elements. In FIG. 2, the microbolometer array 300 includes a number of thermally isolated sensor elements 320 and a number of less thermally isolated sensor elements 322. The less thermally isolated sensor elements 322, or dummy sensor elements, may be intentionally thermally coupled to the substrate 302 by a thermal coupler 324.

In FIG. 2, the first sensor element in each row is thermally coupled to the substrate 302 by a thermal coupler 324. Various embodiments of thermal coupler 324 are possible without deviating from the spirit and scope of the present invention. Examples of thermal couplers may include, for example, a fusion bond between less thermally isolated sensor element 322 and the substrate 302, a metal film disposed between less thermally isolated sensor element 322 and the substrate 302, and/or a glass film disposed between less thermally isolated sensor element 322 and the substrate 302. Rather than providing a separate thermal conductor 324, it is contemplated that the less thermally isolated sensor elements 322 may be directly disposed on the substrate 302, or even imbedded in the substrate 302, if desired.

Each of the column select switches, such as column select switch 306, may include a field effect transistor (FET). It is contemplated, however, that each of the column select switches 306 may include any suitable switching device such as, for example, diodes, transistors, triacs, silicon controlled rectifiers, etc.

In the illustrative embodiment, the pixels 304 are arranged into a number of rows and columns. The microbolometer array 300 includes a first column 342, a second column 344, a third column 346, and an Nth column 348. The microbolometer array 300 also includes a first row 332, a second row 334, a third row 336, and an Mth row 338. N and M may be any integer greater than zero.

The column select switch 306 of each pixel 304 in first column 342 is shown coupled to a first column address line 352. The microbolometer array 300 also includes a second column address line 354 associated with second column 344, a third column address line 356 associated with a third column 346, and a Nth column address line 358 associated with a Nth column 348. First column address line 352, second column address line 354, third column address line 356, and Nth column address line 358 are all coupled to a column select control circuit 350. The column select control circuit 350 preferably sequentially activates the column select switches 306 in each column. In one embodiment, the column select circuit 350 includes a shift register that sequentially selects each of the columns to read each of the sensor elements in a selected row.

In FIG. 2, the sensor element of a first pixel in a first row 332 is coupled to a corresponding first row readout line 362 via a column select switch 306. Likewise, each of the remaining sensor elements in the first row 332 are coupled to the first row read line 362 via a corresponding column select switch, as shown. In addition, each of the sensor elements in the second row 334 are coupled to a second row readout line 364 via a corresponding column select switch. The sensor elements in the remaining rows 336 and 338 are similarly connected to a corresponding row readout line.

First row readout line 362, second row readout line 364, third row readout line 366, and Mth row readout line 368 are each coupled to a corresponding row readout switch, such as row read out switch 360. Each row readout switch selectively couples the corresponding row readout line to read output line 372 of the microbolometer array 300. In a preferred embodiment, each row readout switch is a pass gate, but other suitable switching mechanisms may be used. Each row readout switch 360 is controlled by a row readout control circuit 370. Row readout control circuit 370 is preferably adapted to selectively activate the row readout switch 360 that is associated with a desired row of sensor elements. Like the column select circuit 350, the row readout circuit 370 preferably includes a shift register.

During operation, the sensor elements in a first selected row are read in succession from a first sensor element to a last sensor element before the sensor elements in a next selected row are read. In a preferred method, the first sensor element 322 that is selected in each row is one of the less thermally isolated sensor elements (e.g., dummy sensor element). Selecting a dummy sensor element after a new row is selected advantageously allows transients on the newly selected row readout line to be more readily absorbed by the less thermally isolated sensor element.

The dummy sensor elements are preferably configured so that they are selected when a row read line is initially selected. Thus, it is the "dummy" sensor element that is subjected to the transients on the newly selected row read line, and not the thermally isolated sensor elements used for imaging. In one embodiment, a sufficient number of columns of "dummy" sensor elements are provided so that the transients on the newly selected row read line have sufficient time to settle out before the thermally isolated sensor elements are read. Alternatively, a single column of dummy sensor elements may be provided, as shown in FIG. 2, and the column select control circuit 350 may be configured so that the dummy sensor element remains selected for a longer period of time, such as until the transients on the newly selected row read line have settled out. Finally, and as indicated above, the column or columns of dummy sensor elements may be thermally isolated sensor elements, with the output of the dummy sensor elements simply discarded and not used to form the image.

Figure 3:
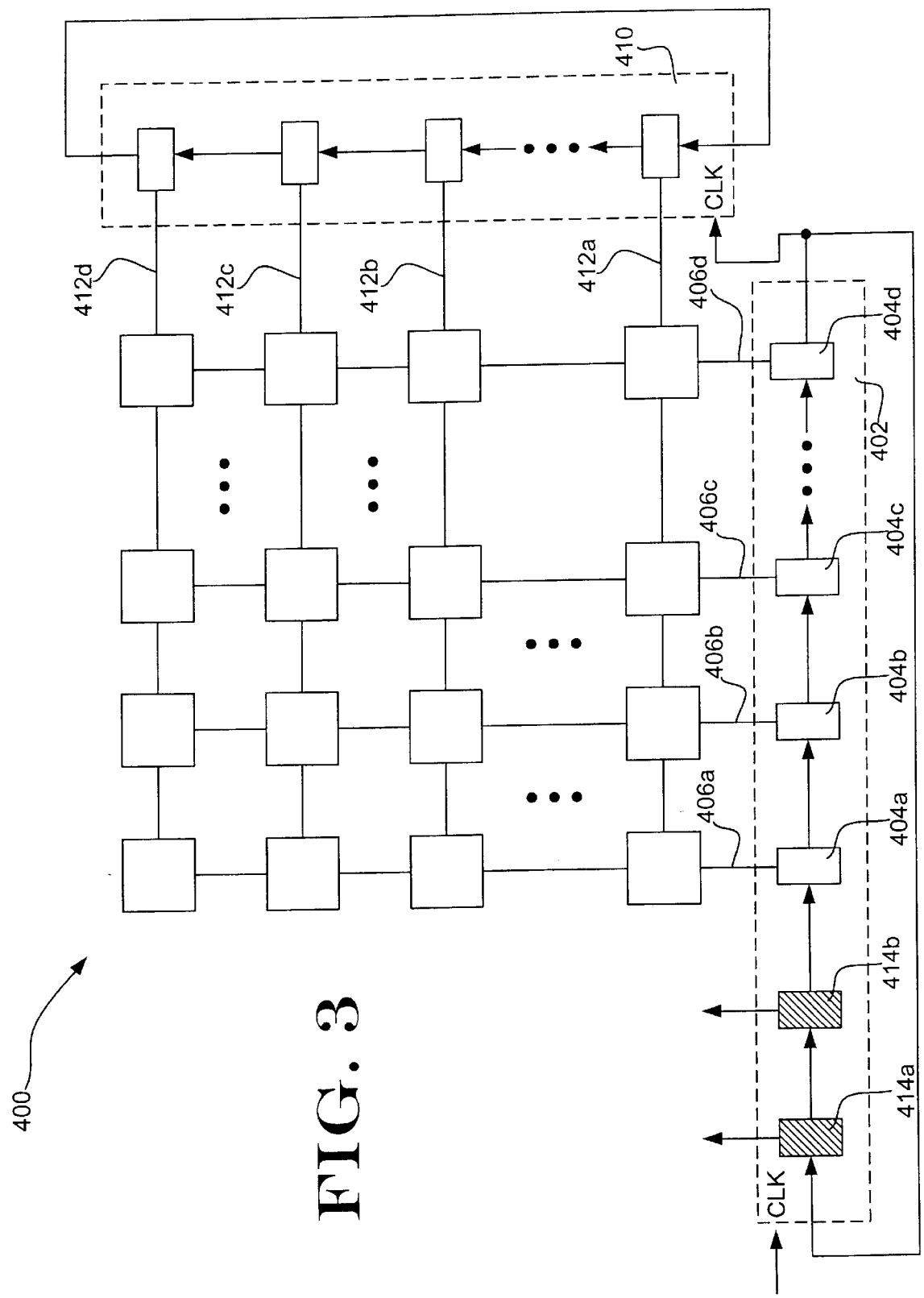
FIG. 3 is a schematic diagram of a microbolometer array in accordance with yet another illustrative embodiment of the present invention.

In another illustrative embodiment, and as shown in FIG. 3, dummy sensors are not required. FIG. 3 shows an array of sensor elements 400 that are thermally isolated from the substrate. Like the embodiment of FIG. 2, the column select circuit 402 may include a shift register having a number of stages 404a–404d that, when a control bit having a value of "1" is shifted through the stages 404a–404d, the column select lines 406a–406d are sequentially selected. After the last column select line 406d is selected, a clock pulse is provided to the row readout circuit 410, which causes a control bit having a value of "1" to select a next one of the row select line 412a–412d.

To prevent the selection of any of the sensor elements 400 immediately after a new row read line is selected, the shift register of the column select circuit 402 may include one or more additional stages 414a–414b that do not control a corresponding control select line. Thus, when a control bit is initially shifted into the shift register of the column select circuit 402, all columns are deselected until the control bit is shifted into stage 404a. A sufficient number of additional bits 414a–414b may be provided so that none of the sensor elements 400 are selected during expected transients on the newly selected row read line. This may help prevent damage to the thermally isolated sensor elements 400, and may make it easier to read the first few columns of sensor elements 400.

Figure 4:
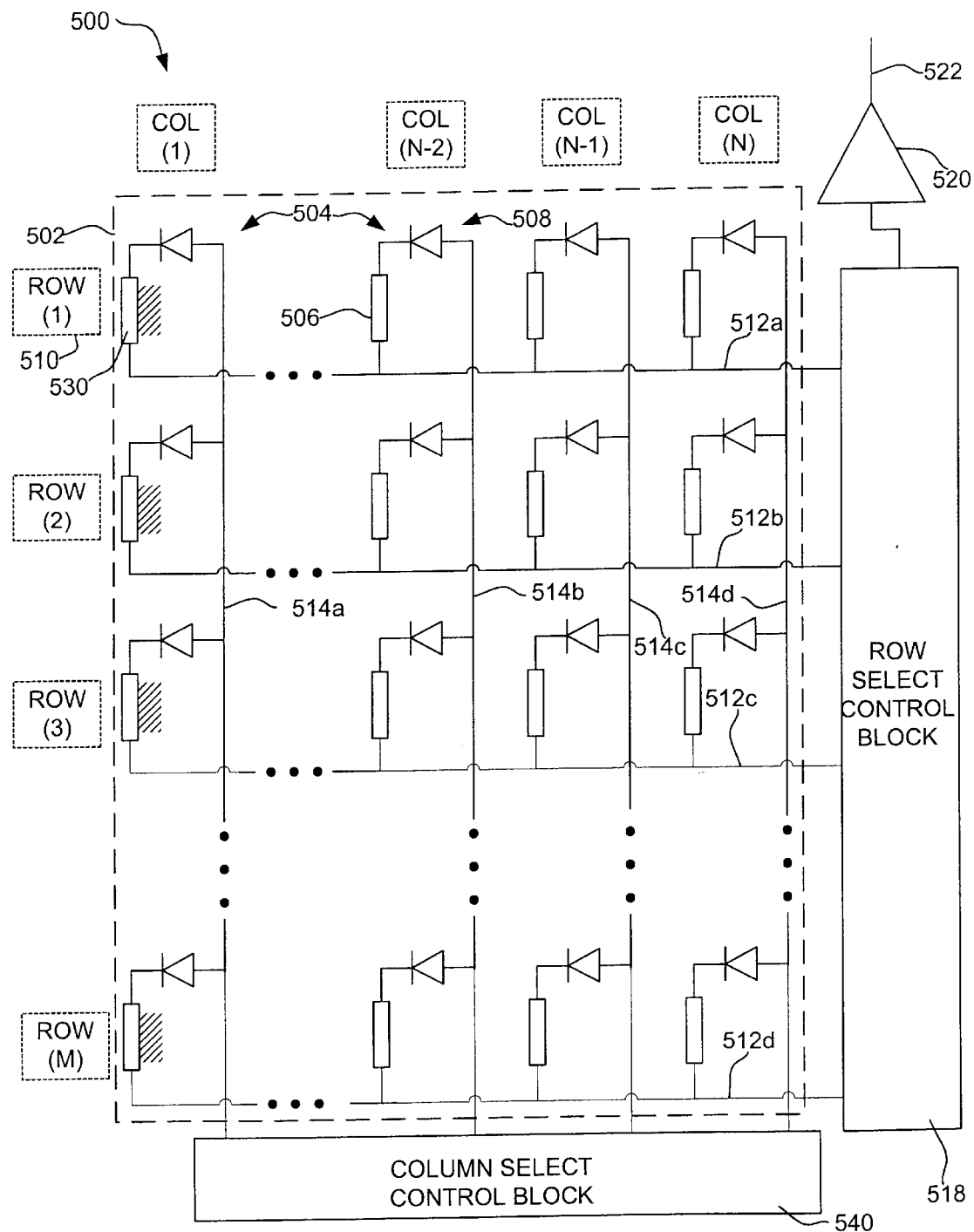
FIG. 4 is a schematic diagram of a microbolometer array in accordance with another illustrative embodiment of the present invention.

FIG. 4 is a schematic diagram of a microbolometer array 500 in accordance with another illustrative embodiment of the present invention. The microbolometer array 500 includes a substrate 502 and a plurality of pixels 504. Each pixel 504 includes a sensor element 506 and a pixel select switch 508. In the embodiment of FIG. 4, each of the pixel select switches 508 include a diode.

Each of the sensor elements have a first terminal that is connected to a corresponding row readout line 512a–512d. A second terminal of each of the sensor elements is coupled to a corresponding column select line 514a–514d through a corresponding pixel select switch 508.

To select a particular sensor element, such as sensor element 506, a row readout line, such as row select line 512a, is selected by row select control block 518. Like in FIG. 2, the row select control block 518 may connect the selected row select line 512a to the input of a transimpedance amplifier 520. The transimpedance amplifier 520 connects the selected row select line 512a to a virtual ground. Prior to being selected, the row readout line is likely to be at about one diode drop below the supply voltage. A column select line is then asserted, such as column select line 514b. This causes current to flow through the pixel select switch 508 and the selected sensor element 506, and finally to the input of the transimpedance amplifier 520. The transimpedance amplifier provides an output signal 522 that is related to the current flowing through the selected sensor element 506.

During operation, the sensor elements in a first selected row are preferably read in succession from a first sensor element to a last sensor element before the sensor elements in a next selected row are read. In one method, the first sensor element that is selected in each row is a less thermally isolated sensor element (e.g., dummy sensor element), as shown for example at 530. Selecting a dummy sensor element after a new row is selected advantageously allows transients on the newly selected row readout line to be more readily absorbed by the less thermally isolated sensor element.

The dummy sensor elements are preferably configured so that they are selected when a row read line is initially selected. Thus, it is the "dummy" sensor element that is subjected to the transients on the newly selected row read line, and not the thermally isolated sensor elements that are used for imaging. In one embodiment, a sufficient number of columns of "dummy" sensor elements are provided so that the transients on the newly selected row readout line have sufficient time to settle out before the thermally isolated sensor elements are selected and read. Alternatively, a single column of dummy sensor elements may be provided, as shown in FIG. 4, and the column select control circuit 540 may cause the dummy sensor element to remain selected for a longer period of time, such as until the transients on the newly selected row read line have settled out. Finally, and as described above with respect to FIG. 3, no dummy sensors may be needed, particularly when the column select control circuit 540 is configured to not select any sensor elements until after the transients on a newly selected row readout line have settled out.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An infrared radiation sensor, comprising:
   a substrate;
   a plurality of sensor elements fixed relative to the substrate;
   at least one of the sensor elements being less thermally isolated from the substrate than another one of the sensor elements.

2. The infrared sensor of claim 1, wherein each of the sensor elements include a resistor.

3. The infrared sensor of claim 2, wherein each of the sensor elements include a thin film resistor.

4. The infrared sensor of claim 1, wherein the plurality of sensor elements are arranged into a number of rows and columns, each row having a row read line, with each sensor element in a row connected between a supply and a corresponding row read line through a column select switch, the column select switch being controlled by a corresponding column select signal, a readout line being selectively connected to the row readout lines through a number of row select switches, each row select switch being controlled by a corresponding row select signal, the readout line being coupled to a second supply via a transimpedance amplifier.

5. The infrared sensor of claim 4, wherein the sensor elements in a selected row are read in succession from a first sensor element to a last sensor element before the sensor elements in a next selected row are read.

6. The infrared sensor of claim 5, wherein at least one of the first sensor elements are less thermally isolated from the substrate than another sensor element in the same row.

7. The infrared sensor of claim 6, wherein the first sensor element in each row is selected by the column select signal for a longer period of time than another one of the sensor elements in the same row.

8. The infrared sensor of claim 7 wherein each column select switch comprises a transistor.

9. The infrared sensor of claim 8 wherein each row select switch comprises a pass gate.

10. The infrared sensor of claim 1, wherein the plurality of sensor elements are arranged into a number of rows and columns, each row having a row read line and each column having a column select line, with each sensor element in a row connected between a unique column select line and a common row read line through a unique column select switch, a readout line being selectively connected to the row readout lines through a number of row select switches, each row select switch being controlled by a corresponding row select signal, the readout line being coupled to a second supply via a transimpedance amplifier.

11. The infrared sensor of claim 10, wherein the column select switch includes a diode.

12. An infrared sensor array, comprising:
    a substrate;
    a plurality of sensor elements fixed relative to the substrate and arranged into a number of rows and columns;
    each row having a corresponding row read line;
    each sensor element connected between a supply and a corresponding row read line through a column select switch, the column select switch being controlled by a corresponding column select signal;
    a read output line;
    each of the row read lines selectively connected to the read output line through a corresponding row select switch, each row select switch being controlled by a corresponding row select signal;
    the readout line coupled to an amplifier; and
    a controller for controlling the row select signals and the column select signals such that the sensor elements in a selected row are selected and read in succession from a first sensor element to a last sensor element before the sensor elements in a next row are selected and read, the controller selecting the first sensor element in each row for a longer period of time than another sensor element in the same row.

13. An infrared sensor array according to claim 12, wherein the first sensor element that is selected in each row is less thermally isolated from the substrate than another sensor element in the same row.

14. The infrared sensor of claim 12, wherein each column select switch comprises a transistor.

15. The infrared sensor of claim 12, wherein each row select switch comprises a pass gate.

16. The infrared sensor of claim 12, wherein the amplifier is a transimpedance amplifier.

17. The infrared sensor of claim 16, wherein the transimpedance amplifier effectively grounds the read output line.

18. A method for reading an infrared sensor array having a number of infrared sensor elements that are arranged into a number of rows and columns, the method comprising:
    sequentially reading the sensor elements of a first selected row of the infrared sensor array from a first sensor element to a last sensor element, the first sensor element being read longer than a subsequent sensor element; and sequentially reading the sensor elements of a second selected row of the infrared sensor array from a first sensor element to a last sensor element, the first sensor element being read longer than a subsequent sensor element.

19. A method according to claim 18, wherein the first sensor element of each row has a higher thermal mass than subsequent sensor elements in the same row.

20. An infrared radiation sensor, comprising:

a substrate;

a plurality of sensor elements fixed relative to the substrate;

at least one of the sensor elements being less thermally isolated from the substrate than another one of the sensor elements; and a controller for selecting a sensor element that is less thermally isolated from the substrate when a transient is expected.

21. An infrared radiation sensor, comprising:

a plurality of sensor elements;

at least one of the sensor elements being less thermally isolated from the substrate than another one of the sensor elements; and a controller for deselecting all sensor elements when a transient is expected.

22. An infrared radiation sensor for providing an image, comprising:

a substrate;

a plurality of image-forming thermally isolated sensor elements having substantially similar sensing characteristics fixed relative to the substrate, the plurality of image-forming thermally isolated sensor elements arranged into a number of rows and a number of columns;

at least one sensor element in each row being the sensor element that is initially selected and read in each row; and the at least one sensor element in each row providing an output signal that is not used to form the image.

23. The infrared radiation sensor of claim 22 wherein the at least one sensor in each row is selected and read for a longer period of time than another sensor in the same row.

24. The infrared radiation sensor of claim 23 wherein the at least one sensor in each row is selected and read for a longer period of time than all other sensors in the same row.

25. The infrared radiation sensor of claim 22 wherein the at least one sensor in each row is less thermally isolated from the substrate than another sensor in the same row.

26. The infrared radiation sensor of claim 25 wherein the at least one sensor in each row is less thermally isolated from the substrate than all other sensors in the same row.

* * * * *